No. 836,206. PATENTED NOV. 20, 1906.
C. PEARSON.
HAY RAKE.
APPLICATION FILED MAY 28, 1906.
2 SHEETS—SHEET 2.
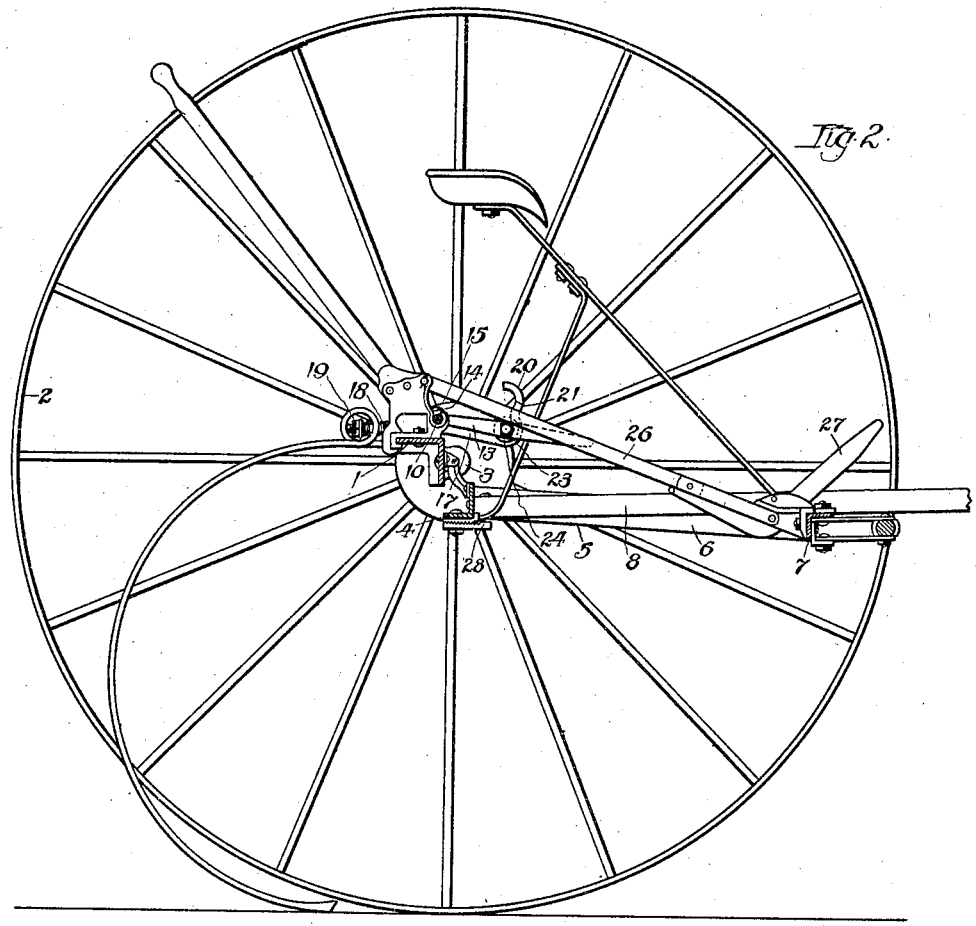
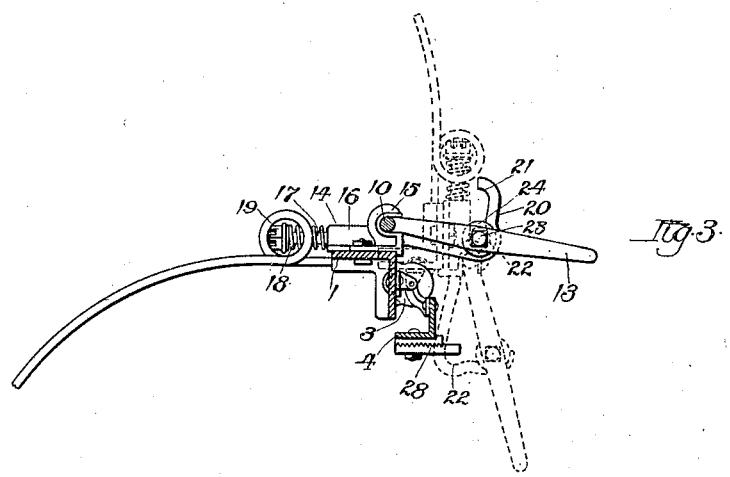
Witnesses:
F. W. Hoffmeister.
J. N. Daggett.
Inventor
Charles Pearson.
By E. W. Burgues
Attorney.

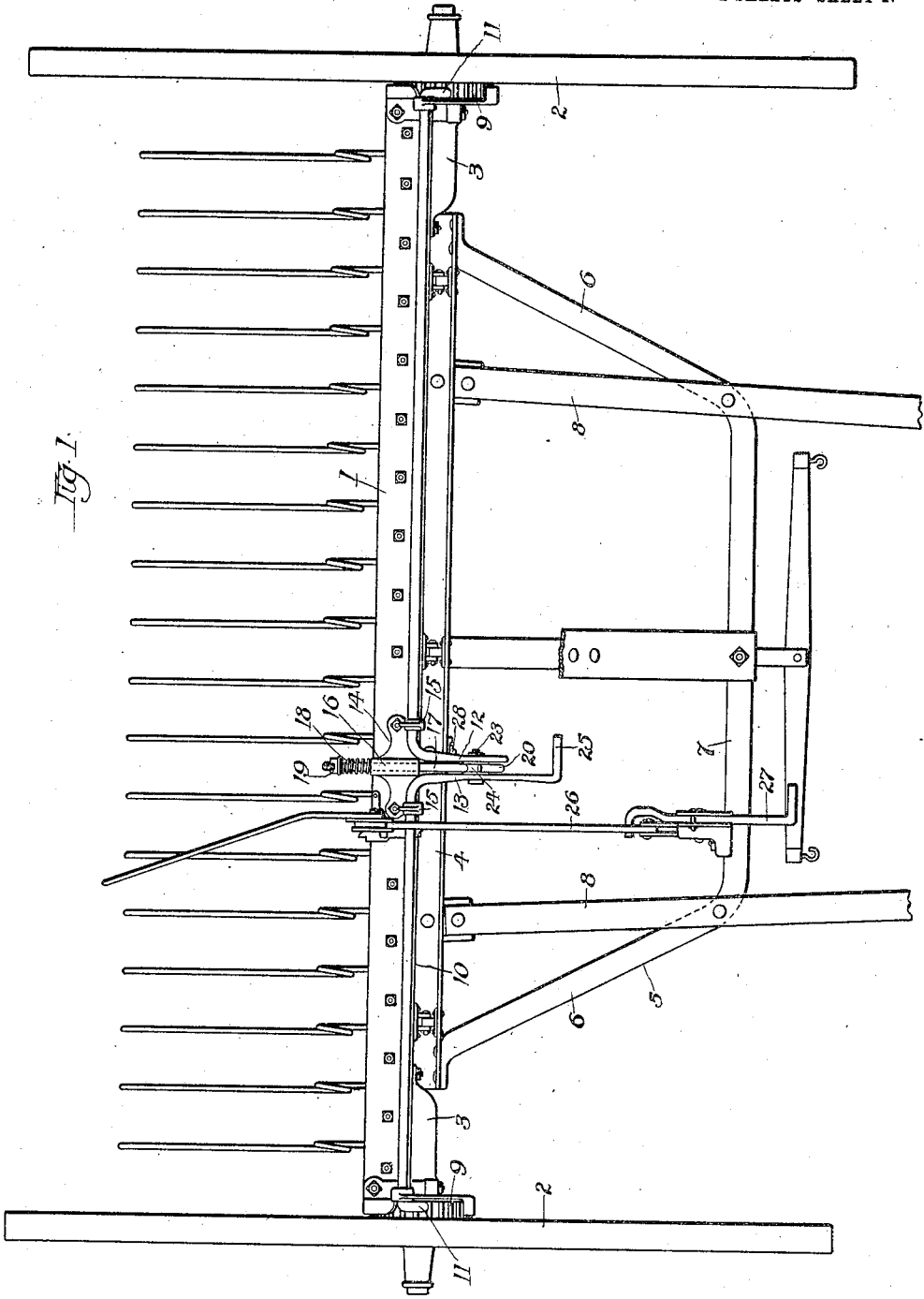

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

HAY-RAKE.

No. 836,206.  Specification of Letters Patent.  Patented Nov. 20, 1906.

Application filed May 28, 1906. Serial No. 318,986.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification, reference being had to the accompanying drawings, forming a part thereof.

My invention relates to means for tripping the rake-dumping mechanism into operative position, the object of the invention being to provide a mechanism having few parts, strong in construction, and positive in its action.

Referring to the drawings, Figure 1 represents a plan view of a hay-rake having my invention embodied therein. Fig. 2 is an end view, partly in section, of Fig. 1; and Fig. 3 is a sectional elevation of a portion of the tripping mechanism.

Similar reference-numerals designate like parts throughout the several views.

1 represents a rake-head to which the teeth are attached by any approved means.

2 designates the carrying-wheels, journaled upon stub-axles 3, secured to the rake-head.

4 is a draft-bar connected with the head by means of the usual hinge-jointed mechanism.

5 is a draft-frame having rearwardly-extending side portions 6, secured to the draft-bar, and a forward transverse portion 7, and 8 represents the thills, secured to the draft-frame.

9 represents a common form of ratchet-wheels secured to the hubs of the carrying-wheels in a manner to rotate therewith.

10 is a rock-shaft mounted in bearings secured to the rake-head and having pawls 11 at opposite ends thereof adapted to engage with the teeth of the ratchet-wheels when rocked in one direction. The rock-shaft comprises two members in axial alinement having forwardly-extending arm portions 12 and 13 at their inner ends, with an intervening space between said portions.

14 is a bracket secured to the rake-head, having integral therewith and at opposite ends thereof bearings 15, in which the rock-shaft is journaled, and an intermediate barrel portion 16, transversely arranged relative to the rake-head and coincident with the space between the portions 12 and 13 of the rock-shaft.

17 is a transversely-arranged latch-bar slidably received by the barrel portion 16 and extending rearward therethrough is provided with a spiral spring 18, encircling the same and operative between the rear end of the barrel and an adjusting-nut 19 at the rear end of the bar in a manner to slide the bar in one direction, and at its forward end the bar is provided with an upturned end portion 20, that projects through the intervening space between the portions 12 and 13, and 21 and 22 represent upper and lower depressions formed therein.

The portions 12 and 13 are connected by means of a bolt 23, and journaled upon the bolt is a sheave 24, adapted to contact with the rear side of the upturned portion 20 of the bar 17.

The forwardly-projecting portion 13 extends beyond the portion 12 and is provided with a laterally-extending portion 25, forming a foot-piece for the operator by means of which he may manipulate the tripping mechanism.

26 represents a common form of toggle connection between the rake-head and the transverse member 7 of the draft-frame, and 27 is a foot-lever mounted in a manner operative to control the movement of the same.

In operation the mechanism is manipulated in the following manner to dump the load accumulated by the rake: The operator places his foot upon the foot-piece 25 and pressing downward thereon causes the shaft 10 to rock in its bearings and the pawls 11 to engage the teeth of the ratchet-wheels, and the sheave 24 passes from the upper to the lower depression in the portion 20 of the bar 17 against the action of the spring 18, which operates to yieldingly hold the sheave seated in said depression and the pawls in engagement with the ratchet-wheels until the rake is dumped and its load released, when the arm 12 will contact with an adjustable stop-block 28, secured to the draft-bar 4, and move the arms to their initial position, with the sheave in the upper depression and the pawls released.

What I claim as my invention, and desire to secure by Letters Patent, is—

1. A hay-rake comprising, in combination, carrying-wheels, a rocking head supported by said wheels, means controlled by the operator and operative to connect said head with said wheels in a manner to rock said head, said means comprising a rock-shaft mounted upon said head and arranged longitudinally thereof, means for rocking said shaft, comprising a forwardly-projecting arm forming a part of said rock-shaft, and a yielding latch-bar mounted upon said head and arranged substantially parallel with said arm, said latch-bar adapted to engage with said arm in a manner to hold it in adjusted position.

2. A hay-rake comprising, in combination, carrying-wheels, a rocking head supported by said wheels, means controlled by the operator and operative to connect said head with said wheels in a manner to rock said head, said means comprising a rock-shaft mounted upon said head and arranged longitudinally thereof, means for rocking said shaft, said means comprising a forwardly-projecting arm forming part of said rock-shaft, a spring-controlled latch-bar mounted upon said head and arranged substantially parallel with said arm, said latch-bar having an offset arm portion provided with depressions adapted to engage with said arm in a manner to hold it in adjusted position.

3. A hay-rake comprising, in combination, carrying-wheels, a rocking head supported by said wheels, means controlled by the operator and operative to connect said head with said wheels in a manner to rock said head, said means comprising a rock-shaft mounted upon said head and arranged longitudinally thereof, said shaft comprising two axially-alined members having forwardly-projecting arms at their inner ends with an intervening space between them, a sheave mounted between said arms, a spring-controlled latch-bar mounted upon said head and arranged substantially parallel with said arm, said latch-bar having an upturned portion passing between said arms and provided with depressions adapted to engage with said sheave in a manner to hold said arms in adjusted position.

CHARLES PEARSON.

Witnesses:
GEORGE W. FREDENBURG,
RAY PATTISON.